Dec. 26, 1961     T. E. EVANS     3,014,342
THERMOSTATIC ELEMENTS
Filed Nov. 21, 1958
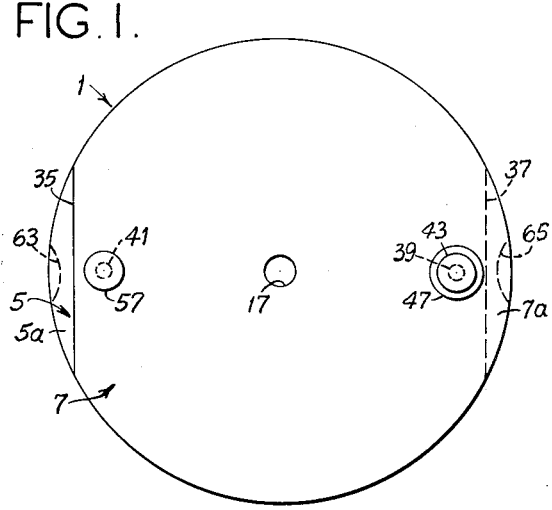
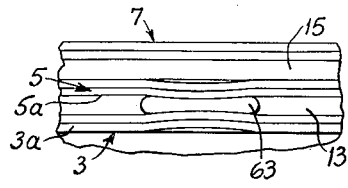
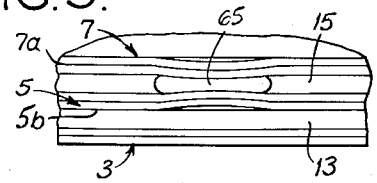
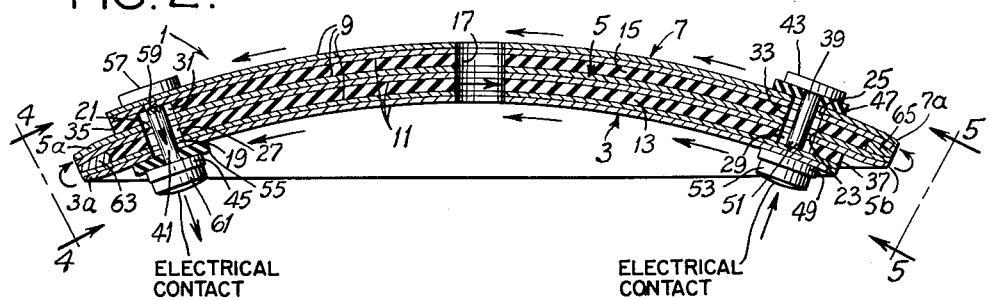
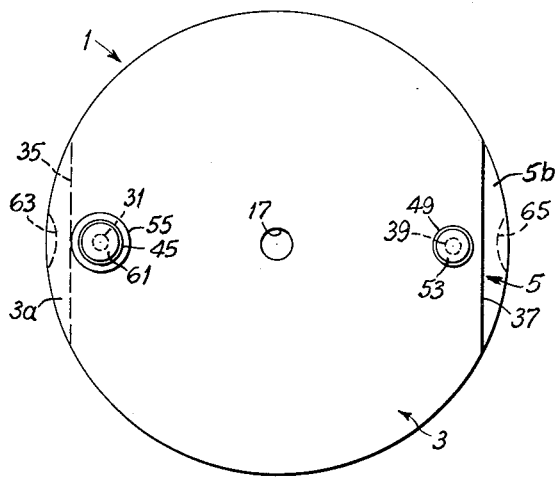
Thomas E. Evans,
Inventor.
Koenig and Pope,
Attorneys.

United States Patent Office 3,014,342
Patented Dec. 26, 1961

3,014,342
THERMOSTATIC ELEMENTS
Thomas E. Evans, Rehoboth, Mass., assignor to Texas Instruments Incorporated, Dallas, Tex., a corporation of Delaware
Filed Nov. 21, 1958, Ser. No. 775,574
11 Claims. (Cl. 60—23)

This invention relates to thermostatic elements, and more particularly to snap-acting thermostatic elements of a type for use in electrical circuit breakers wherein the element is adapted to be heated by current flowing therethrough.

It is conventional to use a snap-acting thermostatic element, such as a known dished snap-acting bi-metallic thermostatic disc, as the control element in a circuit breaker. Under normal conditions, the disc in the circuit breaker is traversed by current, and (due to its electrical resistance) is heated by the current. If overload current should flow, the disc becomes heated to a temperature at which it snaps and opens the circuit in which it is connected. The degree of heating of the disc by current flow through the disc is dependent upon the electrical resistance of the disc. In some instances, it has been found impractical to make a disc of a given size with sufficient electrical resistance to be self-heating to snapping temperature in response to the predetermined overload current. Under such circumstances it has been customary to provide an auxiliary electrical resistance heater in proximity to the disc traversed by current in order that the disc will be sufficiently heated independently of its own resistance to snap in response to current overload.

Among the several objects of this invention may be noted the provision of a novel thermostatic element, and particularly an element of the snap-acting disc or equivalent type, which is so constructed as to have a relatively high electrical resistance for its size, thereby enabling the element to develop in and of itself sufficient heat for change of shape on overload, without any necessity for an auxiliary heater (though the use of such a heater is not excluded); and the provision of a thermostatic element of the character described which enables the use of relatively thin composite thermostat material (such as bimetallic sheet material) as compared with the prior conventional type of element; and the provision of such an element which, while being made of comparatively thin composite thermostat material, has relatively high strength. In general, a thermostatic element constructed in accordance with this invention comprises an assembly of a plurality of layers of composite thermostat material superposed one on another with electrical insulation therebetween, each layer being adapted to conduct electric current and to be heated by current flowing therethrough, each layer being adapted to change shape upon heating, with the layers electrically connected to provide a path for flow of current in series through successive layers. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated:

FIG. 1 is a plan of a dished snap-acting thermostatic element made according to the invention;

FIG. 2 is an enlarged cross section of the element taken on line 2—2 of FIG. 1 with thickness exaggerated for clarity;

FIG. 3 is a bottom plan of the element on the same scale as FIG. 1; and,

FIGS. 4 and 5 are fragmentary edgewise views taken on lines 4—4 and 5—5 of FIG. 2.

Corresponding reference characters indicate corresponding parts throughout the several views of the drawings.

Referring to the drawings, a snap-acting thermostatic element of this invention is designated in its entirety by the reference character 1. As shown, element 1 comprises an assembly of a plurality of layers of composite thermostat material superposed one on another with electrical insulation therebetween. By way of example, three such layers designated 3, 5 and 7 are shown, each constituted by a dished snap-acting thermostatic disc.

It will be understood that it is possible that the element 1 may comprise more than three discs, and, conceivably, it could comprise two discs. It will also be understood that the element 1 may comprise snap-acting plates other than discs of such forms as to be adapted to change shape abruptly upon becoming heated to a predetermined temperature. Each of the discs 3, 5 and 7 is made of composite thermostat material. For example, as illustrated in FIG. 2, each disc is made from bimetallic sheet material composed of two layers or laminations of different metals having different thermal coefficients of expansion. As to each disc, the layer thereof having the lower thermal coefficient of expansion is designated 9 and the layer having the higher thermal coefficient of expansion is designated 11. Layer 9 (the low expansion layer) might, for example, be Invar, which is a nickel-steel consisting of about 36% nickel and the balance iron, and layer 11 (the high expansion layer) might, for example, be either nickel, or a chrome-nickel alloy consisting of about 22% nickel and 3% chromium with the balance iron. Other materials of different coefficients of expansion may be used, as also other numbers of layers if properly selected and related, and the term "composite" comprehends these. It will be understood that as to each disc, the layers 9 and 11 are interfacially bonded, and that each disc is dished to be normally concave in shape on the high expansion side, that is, on the side of the layer 11. It will be further understood that each disc is adapted to conduct electric current and has electrical resistance so as to be heated upon flow of current therethrough. Each disc is adapted to snap from its normal curvature concave on the high expansion side to the opposite curvature concave on the low expansion side upon becoming heated to a predetermined temperature as determined by the set put into the disc.

The discs 3, 5 and 7 are arranged with their high expansion sides 11 oriented in the same direction (downward as shown in FIG. 2) so that all are adapted to snap in tandem in the same direction. As shown, disc 3 is the first and bottom disc of the assembly, disc 5 is the second and intermediate disc, and disc 7 is the third and topmost disc. Between discs 3 and 5 is a first layer of electrical insulation material 13 and between discs 5 and 7 is a second layer of electrical insulation material 15. Layers 13 and 15 may, for example, be constituted by discs of flexible heat-resistant electrical insulation sheet material, such as tape sold under the trade designations Teflon, Isomica, Mylar, etc. These discs of insulation are blanked from sheet stock to shape corresponding to the shape of the bimetal discs.

Each of the bimetallic discs 3, 5 and 7 and each of the insulation discs 13 and 15 has a center hole 17. Bimetallic disc 3 (which constitutes one outer disc of the element 1) has a hole 19 at a point adjacent its periphery. Bimetallic disc 5 (which constitutes the intermediate bimetallic disc of the assembly) has two diametrically opposite holes 21 and 23 at points adjacent its periphery spaced the same distance from its center as hole 19 is spaced from the center of disc 3. Bimetallic disc 7 (which constitutes the other outer disc of the assembly) has a hole 25 at a point adjacent its periphery spaced the same distance from its center as hole 23 is spaced from the center of disc 5. Insulation disc 13 has two diametrically opposite holes 27 and 29 at points adjacent its periphery and insulation disc 15 has two diametrically opposite holes 31 and 33 at points adjacent its periphery. These holes are spaced the same distance from the center of the discs 13 and 15 as holes 21 and 23 are spaced from the center of disc 5. The bimetallic disc 7 is trimed off as indicated at 35 at its edge portion diametrically opposite the hole 25 therein so that discs 3 and 5 have portions 3a and 5a projecting beyond disc 7 at one side of the element 1. Bimetallic disc 3 is trimmed off as indicated at 37 at its edge portion diametrically opposite the hole 19 therein so that discs 5 and 7 have portions 5b and 7a projecting beyond disc 3 at the opposite side of the element 1.

The bimetallic and insulation discs are assembled with their center holes 17 in register, also with holes 19, 27, 21 and 31 of discs 3, 13, 5, 15 in register at one side of the assembly, and with holes 29, 23, 33 and 25 of discs 13, 5, 15 and 7 in register at the diametrically opposite side of the assembly. First and second conductive metal pins 39 and 41 are provided to hold the parts in assembly. Pin 39 has a flat head 43 and pin 41 has a flat head 45. A washer 47 composed of heat-resistant electrical insulation material such as Teflon or mica is applied to the pin 39, and the pin is entered in the registering holes 25, 33, 23 and 29 of discs 7, 15, 5 and 13. The pin 39 is of such length that, with washer 47 engaging the face of disc 7, the end of the pin engages disc 3. A metal welding cap 49 is applied to the outside face of disc 3 in centered relation with respect to the pin 39, and the end of the pin 39 is welded to the inside face of disc 3 as by squeeze welding, the weld being indicated at 51. Thus, pin 39 acts mechanically to hold the parts in assembly. The diameter of the pin 39 is substantially smaller than the diameter of holes 25, 33, 23 and 29 (for example, one-half the diameter of the holes) and the pin is centered in the holes so that there is clearance between the pin and the bimetallic discs 7 and 5. Thus, pin 39 is electrically isolated from discs 5 and 7. A first contact button 53 is welded to the welding cap 49.

An insulation washer 55 similar to washer 47 is applied to the pin 41, and the pin is entered in the registering holes 19, 27, 21 and 31 of discs 3, 13, 5 and 15. The pin 41 is of such length that, with washer 55 engaging the face of disc 3, the end of the pin engages disc 7. A metal welding cap 57 is applied to the outside face of disc 7 in centered relation with respect to the pin 41, and the end of the pin is welded to the inside face of disc 7 as by squeeze welding, the weld being indicated at 59. Thus, pin 41 acts like pin 39 mechanically to hold the parts in assembly. The diameter of the pin 41 is substantially smaller than the diameter of holes 19, 27, 21 and 31 (for example, one-half the diameter of the holes) and the pin is centered in the holes so that there is clearance between the pin and the bimetallic discs 3 and 5. A second contact button 61 is welded to the head 45 of pin 41. Pin 41, in addition to serving as a mechanical connector, serves as an electrical connector between disc 7 and contact 61 (being composed of a suitable electrically conductive material for this purpose). The welding of the end of the pin at 59 to disc 7 provides an electrical connection between the pin and disc 7. However, the pin is out of electrical contact with discs 3 and 5.

The projecting portions 3a and 5a of bimetallic discs 3 and 5 are welded together at their edges as indicated at 63 at a point adjacent the holes 19 and 21. The trimming off of disc 7 at 35 makes accessible edge portions of discs 3 and 5 to facilitate this welding. The projecting portions 5b and 7a of bimetallic discs 5 and 7 are welded together at their edges as indicated at 65 at a point adjacent the holes 23 and 25. The trimming off of disc 3 at 37 makes accessible edge portions of discs 5 and 7 to facilitate this welding. The weld 63, which electrically connects discs 3 and 5 at a localized edge area, lies diametrically opposite weld 65, which electrically connects discs 5 and 7 at a localized edge area. Accordingly, the discs 3, 5 and 7 are electrically connected together in such manner as to establish a tortuous electric current path in series through successive layers. This path may be regarded as starting at the first contact button 53 and proceeding through cap 49 into the first disc 3 at the right hand side thereof as shown in FIG. 2, then to the left through disc 3, through weld 63 to the disc 5, then to the right through disc 5, around through weld 65 to the disc 7, then to the left through disc 7, and through pin 41 to the second contact button 61 on the head 45 of pin 41. This tortuous series path is indicated by arrows in FIG. 2.

It will be understood that contact buttons 53 and 61 are provided on what amounts to the high expansion face of the element 1 for engagement with the usual fixed contacts in a thermostatic circuit breaker, the element 1 being mounted as usual on a center post with buttons 53 and 61 normally engaging the stated fixed contacts. The element 1 conducts current from one of these fixed contacts to the other in the above-described tortuous path. The center hole in element 1 at 17 is provided for mounting the element on the center post. A simple circuit breaker of this type (but with an auxiliary heater) is shown for example in U.S. Patent 2,199,387. The discs 3, 5 and 7, due to their internal resistances, are self-heated by the current flowing therethrough, and if sufficiently heated (as on flow of overload current) will snap from their normal curvature shown in FIG. 2 to an opposite curvature to snap the contact buttons 53 and 61 away from the stated fixed contacts. Each of the discs 3, 5 and 7 may be what are referred to as automatic reset discs, meaning that they will automatically snap back to their normal curvature upon cooling, or they may be manually reset discs, meaning that they must be manually snapped back to their normal curvature after cooling. In the first case, the element 1 becomes an automatic reset element, and in the second case, a manual reset element.

The discs 3, 5 and 7 may be made of relatively thin composite thermostatic material so that each disc has a relatively high electrical resistance. With the three discs electrically connected in series in the tortuous current path relation above described, the resistance of the element 1 as a whole is the sum of the high individual resistances of the three discs 3, 5 and 7, which means that the element is capable of developing a relatively large amount of heat and rapid temperature increase for its size. Moreover the construction consisting of the nested forms of the discs and of the interposed insulation reduces heat loss by radiation so that temperature rise is compartively rapid. It will be noted in this regard that the electrical insulation also functions as a heat insulator, particularly as regards the intermediate disc 5. While each of the three discs 3, 5 and 7 may be relatively thin for high electrical resistance purposes, the union of the three discs provides adequate mechanical strength. A comparison may be made with a disc consisting of a single layer of bimetallic material having a thickness corresponding to the sum of the thicknesses of the three discs 3, 5 and 7 for comparable strength. Such a disc, having three times the thickness, and providing a much shorter current path, would have much less resistance though no more strength than an element of this invention. Accordingly, an element of this invention may in many cases be made so as to eliminate any necessity for the use of an auxiliary electrical resistance heater to heat the element to snapping temperature (all the necessary resistance being in the element itself). This is not to say, however, that the use of an auxiliary heater in conjunction with an element of this invention is excluded. In some instances it may be desired to use an auxiliary heater with an element of this invention, the use of the element still being advantageous. With all the resistance in the element itself, however, a circuit breaker can be made with a lower voltage drop across the circuit breaker than in the case where an auxiliary heater is used. A circuit breaker using an element of this invention without an auxiliary heater has the further advantage, over a circuit breaker using a single disc of composite thermostat material and an auxiliary heater, of lesser heat loss by radiation, as above pointed out.

While the invention is herein illustrated as it applies to a dished snap-acting thermostatic element comprising a plurality of dished snap-acting discs, it will be understood that the principles of the invention may be applicable to other types of thermostatic elements, whether snap-acting or slow-acting.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A thermostatic element comprising an assembly of a plurality of layers of composite thermostat material superposed one on another with electrical insulation therebetween, each layer comprising at least two laminations of different materials, each layer being adapted to conduct electric current and to be heated by current flowing therethrough, each layer changing shape abruptly upon becoming heated to a predetermined temperature, said layers being arranged so that all change shape abruptly in the same direction, and said layers being electrically connected to provide a path for flow of current through successive layers in series.

2. A thermostatic element as set forth in claim 1 wherein said layers of composite thermostat material are electrically connected only at edge portions thereof.

3. A thermostatic element comprising an assembly of a plurality of dished snap-acting thermostatic discs superposed one on another with electrical insulation therebetween, each disc comprising at least two layers of different materials, each disc being adapted to carry electric current and to be heated by current flowing therethrough, said discs being arranged so that all snap in the same direction upon becoming heated to a predetermined temperature, said discs being electrically connected to provide a path for flow of current through successive discs in series.

4. A thermostatic element as set forth in claim 3 wherein said discs are electrically connected only at peripheral edge portions thereof.

5. A thermostatic element comprising an assembly of a plurality of plates of composite thermostat material superposed one on another with electrical insulation therebetween, each plate comprising at least two laminations of different materials, each plate being adapted to conduct electric current and to be heated by current flowing therethrough, each plate changing shape abruptly upon becoming heated to a predetermined temperature, said plates being arranged so that all change shape abruptly in the same direction, spaced first and second contacts on one outside plate of the assembly, the first contact being in conductive relation to said one outside plate and the second contact being electrically insulated from said one outside plate, an electrical connection between the other outside plate of the assembly and said second contact, and said plates being electrically connected to provide a path for flow of current from said first contact in series through the plates to the second contact.

6. A thermostatic element as set forth in claim 5 wherein said plates are electrically connected only at edge portions thereof.

7. A thermostatic element comprising an assembly of a plurality of dished snap-acting thermostatic discs superposed one on another with electrical insulation therebetween and arranged so that all snap in the same direction upon becoming heated to a predetermined temperature, each disc comprising at least two laminations of different materials, each disc being adapted to carry electric current and to be heated by current flowing therethrough, a first contact on one outside disc of the assembly located at a point adjacent the periphery thereof, a second contact on said one outside disc located at a point adjacent the periphery thereof diametrically opposite the first contact, the first contact being in conductive relation to said one outside disc and the second being electrically insulated from said one outside disc, and an electrically conductive member extending from said second contact through a hole in said assembly to the other outside disc of said assembly and secured thereto to fasten the assembly together and electrically connect said other outside disc and said second contact.

8. A thermostatic element comprising an assembly of first, second and third plates of composite thermostat material superposed one on another with electrical insulation therebetween, each plate comprising at least two laminations of different materials, each plate being adapted to carry electrical current and to be heated by current flowing therethrough, each plate being so formed that it changes shape abruptly upon becoming heated to a predetermined temperature, said plates being arranged so that all change shape abruptly in the same direction, the first plate being electrically connected to the second only at a point at one side of the assembly, and the second being electrically connected to the third only at a point at the opposite side of the assembly, thereby providing a path for flow of current through said first, second and third plates in series.

9. A thermostatic element comprising an assembly of first, second and third plates of composite thermostat material superposed one on another with electrical insulation therebetween, each plate being adapted to carry electrical current and to be heated by current flowing therethrough, each plate comprising at least two laminations of different materials, each plate being so formed that it changes shape abruptly upon becoming heated to a predetermined temperature, said plates being arranged so that all change shape abruptly in the same direction, the first and second plates having portions projecting beyond the third plate at one side of the assembly and welded together for electrical connection of said first and second plates, and the second and third plates having portions projecting beyond the first plate at the opposite side of the assembly and welded together for electrical connection of said second and third plates, thereby providing a path for flow of current through said first, second and third plates in series.

10. A thermostatic element comprising an assembly of first, second and third dished snap-acting thermostatic discs superposed one on another with a first disc of electrical insulation between the first and second thermostatic discs and a second disc of electrical insulation between the second and third thermostatic discs, each disc comprising at least two laminations of different materials, each thermostatic disc being adapted to carry electrical current and to be heated by current flowing therethrough, said thermostatic discs being arranged so that all snap in the same direction upon becoming heated to a predetermined temperature, first and second contacts on the first thermostatic disc located at diametrically opposite points adjacent the periphery thereof, the first contact being in conductive relation to the first thermostatic disc and the second contact being electrically insulated from the first thermostatic disc, an electrically conductive pin extending from the second contact through registering holes in the first thermostatic disc, the first insulation disc, the second thermostatic disc and the second insulation disc to the third thermostatic disc and electrically and mechanically connected thereto, said pin being out of contact with the first and second thermostatic discs, said first and second thermostatic discs being electrically connected together at a point adjacent said second contact and said second and third thermostatic discs being electrically connected together at a point adjacent said first contact.

11. A thermostatic element comprising an assembly of a plurality of layers of composite thermostat material and electrical insulation superposed one on another with the electrical insulation between the composite thermostat material layers, opposing faces of said superposed layers being in direct interfacial contact, said layers being movable in concert with each other, each composite thermostat material layer comprising at least two laminations of different materials, each composite thermostat material layer being adapted to conduct electric current and to be heated by current flowing therethrough, each composite thermostat material layer changing shape upon heating, and said composite thermostat material layers being electrically connected to provide a path for flow of current in series through successive layers.

References Cited in the file of this patent
UNITED STATES PATENTS

| | | |
|---|---|---|
| 1,219,516 | Whittelsey | Mar. 20, 1917 |
| 2,080,556 | Bolesky | May 18, 1937 |
| 2,275,795 | Musser | Mar. 10, 1942 |
| 2,518,941 | Satchwell et al. | Aug. 15, 1950 |